United States Patent
Finkel

(10) Patent No.: US 11,804,779 B2
(45) Date of Patent: Oct. 31, 2023

(54) POWER CONVERTER WITH VOLTAGE-SELECTIVE SKIP MODE ENTRY LOAD COMPENSATION

(71) Applicant: SEMICONDUCTOR COMPONENTS INDUSTRIES, LLC, Phoenix, AZ (US)

(72) Inventor: Alan David Finkel, Chandler, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 86 days.

(21) Appl. No.: 17/448,398

(22) Filed: Sep. 22, 2021

(65) Prior Publication Data

US 2022/0094270 A1    Mar. 24, 2022

Related U.S. Application Data

(60) Provisional application No. 62/706,968, filed on Sep. 22, 2020.

(51) Int. Cl.
H02M 3/335 (2006.01)
H02M 1/08 (2006.01)
H02M 1/00 (2006.01)

(52) U.S. Cl.
CPC ..... H02M 3/33523 (2013.01); H02M 1/0009 (2021.05); H02M 1/083 (2013.01); H02M 1/0058 (2021.05)

(58) Field of Classification Search
CPC ............. H02M 1/083; H02M 3/33523; H02M 3/33561; H02M 3/33569
See application file for complete search history.

(56) References Cited

U.S. PATENT DOCUMENTS

| | | | | |
|---|---|---|---|---|
| 10,056,842 B2* | 8/2018 | Cannenterre | ..... | H02M 3/33507 |
| 2008/0030178 A1 | 2/2008 | Leonard et al. | | |
| 2008/0175029 A1 | 7/2008 | Jung et al. | | |
| 2014/0112028 A1* | 4/2014 | Fahlenkamp | ..... | H02M 3/33576 |
| | | | | 324/726 |
| 2018/0076722 A1* | 3/2018 | Gong | ...................... | H02M 1/08 |
| 2018/0102709 A1* | 4/2018 | Hari | .................. | H02M 3/33523 |
| 2018/0351464 A1* | 12/2018 | Finkel | ............... | H02M 3/33507 |
| 2019/0013726 A1* | 1/2019 | Podzemny | ............ | H02M 1/083 |
| 2019/0068062 A1* | 2/2019 | Chung | .................. | H02M 7/04 |
| 2019/0089257 A1* | 3/2019 | Chung | .................... | H02M 1/08 |
| 2019/0199222 A1* | 6/2019 | Lin | ................... | H02M 3/33507 |

OTHER PUBLICATIONS

"High-Voltage, Quasi-Resonant, Controller Featuring Valley Lockout Switching"; ON Semiconductor Publication NCP1340; Mar. 2021—Rev. 17; 43 pages; Copyright Semiconductor Components Industries, LLC 2017.

* cited by examiner

*Primary Examiner* — Gary A Nash
(74) *Attorney, Agent, or Firm* — Dickinson Wright PLLC; Mark E. Scott

(57) ABSTRACT

Power converter with voltage-selective skip mode entry. At least one example is a method of operating a power converter, the method comprising: operating, by a controller, the power converter in discontinuous conduction mode; and then operating, by the controller, the power converter in frequency foldback operation; and entering, by the controller, skip mode when load current falls below a skip threshold implemented based on an output voltage of the converter.

20 Claims, 7 Drawing Sheets

POWER CONVERTER WITH VOLTAGE-SELECTIVE SKIP MODE ENTRY LOAD COMPENSATION

CROSS-REFERENCE TO RELATED APPLICATIONS

This application claims priority to and the benefit of U.S. Provisional Application Ser. No. 62/706,968, filed Sep. 22, 2020, titled "AUTO-TUNING SKIP MODE," the entire disclosure of which is hereby incorporated by reference for all purposes.

BACKGROUND

Switched mode power supplies can be used to create a direct current (DC) output of varying voltage levels by switching current through an energy storage element such as a transformer. The duty cycle and/or frequency of the switching is controlled to regulate the output to a desired level (e.g., an output voltage or output current). One popular type of isolated switched mode power supply is a flyback converter.

A flyback converter is based on a transformer arranged for flyback operation. When a primary switch is made conductive, primary current in the transformer stores energy in the field of the transformer. When the primary switch is made non-conductive, a voltage is induced on the secondary winding that forward biases a secondary rectifier. The secondary winding supplies voltage and current to the load as the field of the transformer collapses. A controller varies the on- and off-times of a primary switch to regulate the output to a desired level.

SUMMARY

Power converters with voltage-selective skip mode entry. At least one example is a method of operating a power converter, the method comprising: operating, by a controller, the power converter in a discontinuous conduction mode; and then operating, by the controller, the power converter in frequency foldback operation; and entering, by the controller, skip mode when load current falls below a skip threshold implemented based on an output voltage of the power converter.

The example method may further comprise: generating a current setpoint, the current setpoint based on a difference between a setpoint voltage and the output voltage of the power converter; sensing, during the discontinuous conduction mode, that the current setpoint is below a foldback threshold; and responsive to the current setpoint falling below the foldback threshold transitioning to the operating the power converter in the frequency foldback operation. The foldback threshold may correspond to a load current of less than thirty percent (30%) of a full power load of the power converter.

In the example method, operating the power converter in the frequency foldback operation may further comprise: reading, by the controller, a signal indicative of output voltage; calculating, by the controller, a current value based on the signal indicative of output voltage; and ending each charge mode at the current value lower than a foldback threshold at which began the operating the power converter in the frequency foldback operation. Reading the signal indicative of output voltage may further comprise: receiving a signal indicative of secondary voltage on a secondary winding of a transformer of the power converter during a discharge mode; sensing demagnetization of the transformer based on the signal indicative of secondary voltage; and latching a value indicative of output voltage to be the signal indicative of output voltage. Receiving the signal indicative of secondary voltage may further comprise receiving the signal indicative of secondary voltage on the secondary winding of the transformer by way of an auxiliary winding of the transformer. Calculating the current value may further comprise: calculating a ratio of a nameplate output voltage and the signal indicative of output voltage; and setting the current value based on the ratio.

Another example is a controller for a power converter, the controller comprising: gate terminal, a current-sense terminal, a feedback terminal, and a winding-sense terminal; and a PWM controller coupled to the gate terminal, the current-sense terminal, the feedback terminal, and the winding-sense terminal. The PWM controller may be configured to: operate the power converter in discontinuous conduction mode at a power levels above a first threshold; operate the power converter in frequency foldback operation; and pause assertions of the gate terminal when a load current falls below a skip threshold implemented by the PWM controller based on an output voltage of the converter.

In the example controller, the PWM controller may be further configured to: generate a current setpoint, the current setpoint based on a difference between a setpoint voltage and a signal indicative of output voltage of the power converter sensed on the feedback terminal; sense, during the discontinuous conduction mode, that the current setpoint is below a foldback threshold; and responsive to the current setpoint falling below the foldback threshold transitioning to the operating the power converter to the frequency foldback operation. The foldback threshold may correspond to a load current of less than thirty percent (30%) of a full power load of the power converter.

In the example controller, when the PWM controller operates the power converter in the frequency foldback operation, the PWM controller may be further configured to: read a signal indicative of output voltage; calculate an current value based on the signal indicative of output voltage; and end each charge mode at the current value lower than a foldback threshold at which began the operating the power converter in the frequency foldback operation. When the PWM controller reads the signal indicative of output voltage, the PWM controller may be is further configured to: receive, by way of the winding-sense terminal, a signal indicative of secondary voltage on a secondary winding of a transformer of the power converter during a discharge mode; sense demagnetization of the transformer based on the signal indicative of secondary voltage; and latch a value indicative of output voltage to be the signal indicative of output voltage. When the PWM controller receives the signal indicative of secondary voltage, the PWM controller may be further configured to receive the signal indicative of secondary voltage on the secondary winding of the transformer by way of an auxiliary winding of the transformer. When the PWM controller calculates the current value, the PWM controller may be further configured to: calculate a ratio of a nameplate output voltage and the signal indicative of output voltage; and set the current value based on the ratio.

Another example is a power converter comprising: a primary side comprising a primary winding of a transformer, and a primary switch coupled to the transformer and defining a control input; a secondary side comprising a secondary winding arranged for flyback operation and defining an output voltage, and a secondary rectifier coupled to the transformer; an auxiliary winding of the transformer defining a sense terminal; and a controller defining gate terminal coupled to the control input, a current-sense terminal coupled to the primary switch, a feedback terminal coupled to the output voltage, and a winding-sense terminal coupled to the sense terminal. The controller may be configured to: operate the power converter in discontinuous conduction mode at a power levels above a first threshold; operate the power converter in frequency foldback operation; and pause assertions of the control input when a load current falls below a skip threshold implemented based on a magnitude of the output voltage.

In the example power converter, the controller may be further configured to: generate a current setpoint, the current setpoint based on a difference between a setpoint voltage and a signal indicative of output voltage of the power converter sensed on the feedback terminal; sense, during the discontinuous conduction mode, that the current setpoint is below a foldback threshold; and responsive to the current setpoint falling below the foldback threshold transition to the operating the power converter to the frequency foldback operation. The foldback threshold may correspond to a load current of less than thirty percent (30%) of a full power load of the power converter.

In the example power converter, when the controller operates the power converter in the frequency foldback operation, the controller may be further configured to: read a signal indicative of output voltage; calculate a current value based on the signal indicative of output voltage; and end each charge mode at the current value lower than a foldback threshold at which began the operating the power converter in the frequency foldback operation. When the controller reads the signal indicative of output voltage, the controller may be further configured to: receive, by way of the winding-sense terminal, a signal indicative of secondary voltage on a secondary winding of the transformer of the power converter during a discharge mode; sense demagnetization of the transformer based on the signal indicative of secondary voltage; and latch a value indicative of output voltage to be the signal indicative of output voltage. When the controller calculates the current value, the controller may be further configured to: calculate a ratio of a nameplate output voltage and the signal indicative of output voltage; set the current value based on the ratio.

BRIEF DESCRIPTION OF THE DRAWINGS

For a detailed description of example implementations, reference will now be made to the accompanying drawings in which.

DEFINITIONS

Figure 1:
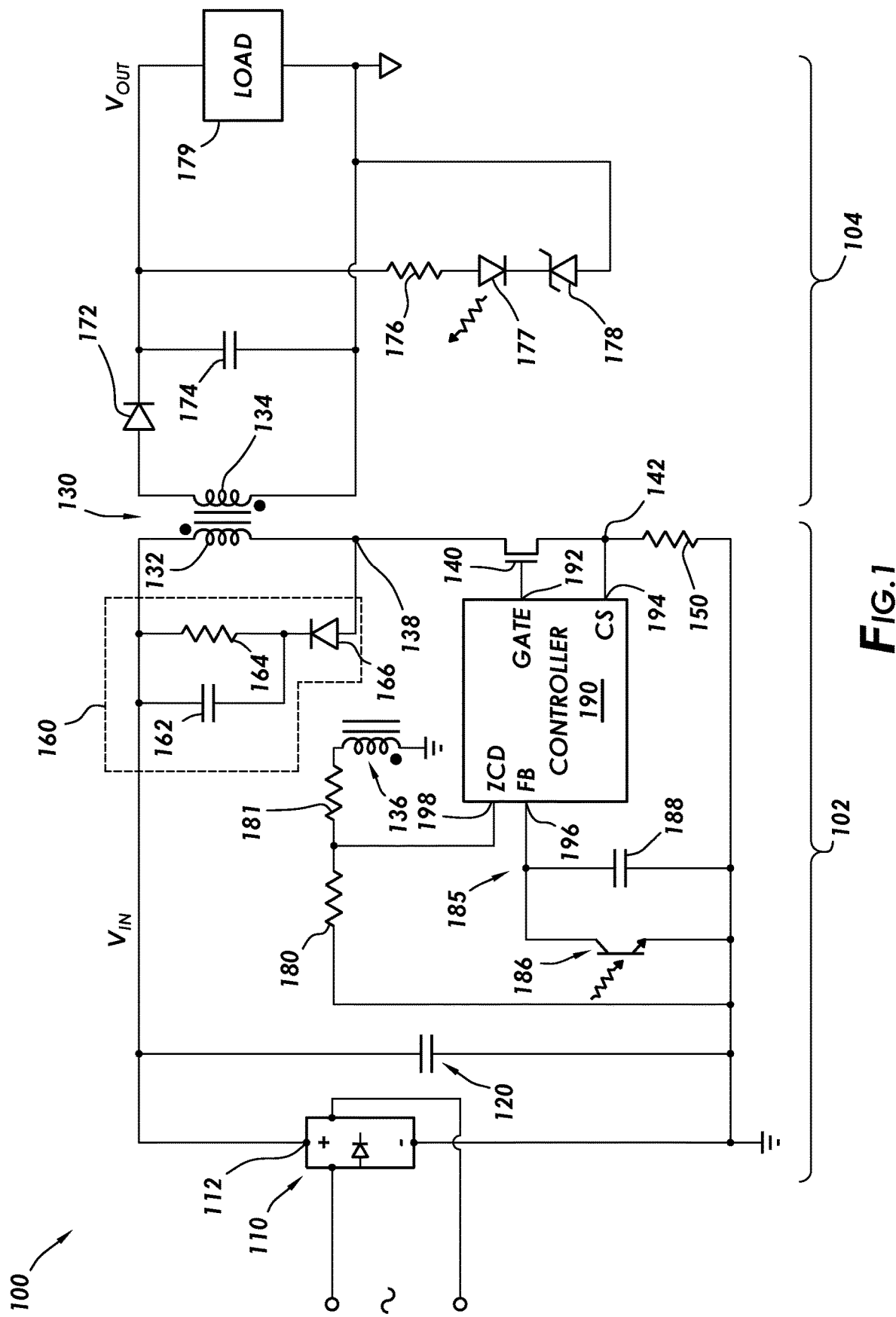
FIG. 1 shows a partial schematic and partial block diagram of a power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device is coupled to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC), a digital signal processor (DSP), process with controlling software, a processor with controlling software, a programmable logic device (PLD), or a field programmable gate array (FPGA), configured to read inputs and drive outputs responsive to the inputs.

"Operating . . . in a discontinuous conduction mode" shall mean any discontinuous conduction mode (e.g., fixed frequency discontinuous, quasi-resonant discontinuous) that is not frequency foldback operation.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to switching power converters with voltage-selective skip mode entry. More particularly, various examples are directed to power converters and related controllers that enter skip mode operation of the power converter when load current falls below a skip threshold implemented based on an output voltage of the power converter (e.g., 3.3V, 5V, or 20V). In some cases, the power converter enters skip mode at about the same load current regardless of the selected and implemented output voltage of the power converter. The specification first turns to an example system to orient the reader.

FIG. 1 shows a partial schematic and a partial block diagram of an example power converter 100. In particular, the power converter 100 comprises a primary side 102 galvanically isolated from a secondary side 104 by way of a transformer 130. The example primary side 102 comprises rectifier 110, an input capacitor 120, a primary winding 132 of the transformer 130, a primary field effect transistor (primary FET 140), a sense resistor 150, and a controller 190. The example secondary side 104 comprises a secondary winding 134 of the transformer 130, a diode 172, an output capacitor 174, and an example load 179.

Turning first to the primary side 102, the rectifier 110 is illustrated in block diagram form and can include an arrangement of one or more diodes in a configuration that rectifies an alternating current (AC) supply. The rectifier 110 produces a rectified waveform at signal node 112. For example, the rectifier 110 may provide a full-wave rectified waveform and the input capacitor 120 smooths the waveform. Thus, the rectifier 110 provides a direct current (DC) input voltage to the primary side 102, hereafter the input voltage $V_{IN}$. In other examples, the rectifier 110 may be omitted, and other upstream devices (e.g., an upstream power converter) may provide the input voltage $V_{IN}$ to the power converter 100.

The example transformer 130 comprises the primary winding 132, the secondary winding 134, and an auxiliary winding 136. The primary winding 132 has a first connection or lead coupled to the signal node 112, and a second connection or lead that defines a switch node 138. The switch node 138 is coupled to the source of the primary FET 140, and the drain of the primary FET 140 is coupled to common or ground on the primary side 102 by way the sense resistor 150. The drain of the primary FET 140 defines a current-sense node 142. In the example power converter 100 the primary FET 140 is shown as an N-channel MOSFET. However, in other examples the primary switch may be a P-channel MOSFET, or any other suitable device that operates as an electrically-controlled switch, such as FETs referred to as "super-junction" (SJFETs), and gallium nitride (GaN) FETs.

The example power converter 100 further comprises a snubber circuit 160 comprising a capacitor 162, a resistor 164, and a diode 166. The capacitor 162 has a first lead coupled to the signal node 112, and a second lead. The resistor 164 has a first lead coupled to the signal node 112 and a second lead coupled to the second lead of the capacitor 162. The diode 166 has an anode coupled to the switch node 138, and a cathode coupled to the capacitor 162 and the resistor 164. At the end of each charge mode (discussed more below), current from the primary winding 132 caused by leakage inductance of the transformer 130 may be snubbed into the snubber circuit 160. The example snubber circuit 160 is a passive snubber in the sense that the controller 190 does not control activation of the snubber circuit 160. In examples in which the power converter 100 operates both continuous conduction mode (CCM) and discontinuous conduction mode (DCM), the snubber circuit 160 may be an active snubber circuit, and thus the diode 166 may be replaced with an electrically-controlled switch, such as a FET.

Still referring to FIG. 1, the example primary side 102 comprises the controller 190. The controller 190 defines a plurality of electrical terminals, including a gate terminal 192 coupled to the control input or gate of the primary FET 140, a current-sense terminal (CS terminal 194) coupled to the current-sense node 142, a feedback terminal (FB terminal 196), and zero-current detect terminal (ZCD terminal 198). The ZCD terminal 198 is coupled to the auxiliary winding 136 by way of a voltage divider comprising resistors 180 and 181. For example, the resistors 180 and 181 may be selected such that the voltage at the node between the resistors 180 and 181 is 1/10th of the voltage at the first connection or lead of the auxiliary winding 136. During periods of time in which the primary FET 140 is non-conductive (e.g., the discharge mode), the voltage on the auxiliary winding 136 is a scaled version of the voltage on the switch node 138, and thus the controller 190 may implement resonant valley detection by way of the ZCD terminal 198. As will be discussed in greater detail below, the example controller 190 also senses a signal indicative of output voltage by way of the ZCD terminal 198.

Still referring to the controller 190. The FB terminal 196 of the controller 190 is coupled to a voltage feedback circuit 185. The example voltage feedback circuit 185 comprises a phototransistor 186 and a capacitor 188. The phototransistor 186 is one member of an optocoupler, and the second member is the photodiode 177 on the secondary side 104. The example phototransistor 186 defines a collector coupled to the FB terminal 196, a base optically coupled to the photodiode 177, and an emitter coupled to ground or common on the primary side 102. The capacitor 188 has a first lead coupled to the FB terminal 196 and thus the collector of phototransistor 186, and a second lead coupled to ground or common on the primary side 102. Thus, the controller 190 receives a signal indicative of output voltage by way of the voltage feedback circuit 185. In other cases, the voltage feedback may be omitted, and the output voltage $V_{OUT}$ may be estimated based on other inputs (e.g., by way of the auxiliary winding 136 and ZCD terminal 198, or based on the voltage at the switch node 138 during the discharge mode). In yet still other cases (not specifically shown), the controller 190 may be partially or fully electrically situated on the secondary side 104, and thus the controller 190 may directly measure the output voltage $V_{OUT}$.

Turning now the secondary side 104. The example secondary winding 134 has a first connection or lead, and a second connection or lead coupled to ground or common on the secondary side 104. The first lead is coupled to a secondary rectifier illustrative shown as a diode 172. In particular, the first lead is coupled to the anode of the diode 172, and the cathode of the diode 172 is coupled to and defines the output voltage $V_{OUT}$. The example secondary side 104 thus implements passive rectification by way of diode 172. However, in other cases the diode 172 may be replaced with an active, synchronous rectifier controlled by a controller, such as a dedicated SR driver disposed electrically on the secondary side 104, or by way of the controller 190 disposed electrically either partially or fully on the secondary side 104. Moreover, the secondary rectifier may be placed at any suitable location, such as between ground or common on the secondary side 104 and the second lead of the secondary winding 134.

The output capacitor 174 has a first lead coupled output voltage $V_{OUT}$ and a second lead coupled to ground or common on the secondary side 104. In order to provide voltage feedback to the primary side 102, the anode of the photodiode 177 is coupled to the output voltage $V_{OUT}$ by way of resistor 176, and the cathode of the photodiode 177 is coupled to ground or common on the secondary side 104 by way of a Zener diode 178.

A switching cycle of the power converter 100, being one switching period, may be conceptually divided into two portions or two modes—a charge mode and a discharge mode. The charge mode begins when the controller 190 asserts the gate terminal of the primary FET 140. The primary FET 140 becomes conductive and enables current to flow through the primary winding 132, through the primary FET 140, and through the sense resistor 150 to ground or common on the primary side 102. Because of the inductive aspects of the primary winding 132, the current ramps upward over time. The current in the primary winding 132 induces a voltage on the secondary winding 134 and the auxiliary winding 136. In the case of the transformer arranged for flyback operation as shown, during the charge mode the voltage on the secondary winding 134 (in conformance with the dot convention shown) reverse biases the diode 172. Similarly during the charge mode, the voltage on the auxiliary winding 136 goes negative (again in conformance with the dot convention). Because the secondary rectifier in the form of the diode 172 is reverse biased during the charge mode, no current flows in the secondary winding 134, and energy is stored in field of the transformer 130.

In example systems the controller 190 implements peak current control during the charge mode to control the output voltage $V_{OUT}$. In particular, the example controller 190 ends each charge mode at a peak current through the primary winding 132. In the example system of FIG. 1, the current through the primary winding 132 in each charge mode is sensed as a voltage on the current-sense node 142; however, the current may be sensed at any suitable location (e.g., as voltage at the switch node 138) and in any suitable form (e.g., using a current transformer, Hall-effect current sensor). When the power converter 100 is providing power above a threshold amount (e.g., above about 30% of the full power load rating of the power converter 100), the current setpoint in each charge mode is based on a difference between a setpoint voltage and the output voltage $V_{OUT}$ of the power converter. It follows that, if output voltage $V_{OUT}$ is low the current setpoint for a particular charge mode is higher, and if output voltage $V_{OUT}$ is high the current setpoint for a particular charge mode is lower. The charge mode ends when the current through the primary winding 132 reaches the current setpoint, and the gate of the primary FET 140 is de-asserted making the primary FET 140 non-conductive.

The discharge mode begins when the primary FET 140 becomes non-conductive. When the primary FET 140 becomes non-conductive, the voltage on the secondary winding 134 reverses, forward biasing the secondary rectifier and providing voltage and current to the output capacitor 174 and the load 179. The secondary winding 134 continues to provide voltage and current as the field associated with the transformer 130 collapses. Assuming a discontinuous conduction mode, at some point during the discharge mode the field associated with the transformer 130 fully collapses, which may be referred to as demagnetization of the transformer 130. At the point of demagnetization, the diode 172 is again reversed biased, and the load 179 is provided power by way of the output capacitor 174 until the next discharge mode.

At the point in time when the field fully collapses, various capacitances and inductances within the power converter 100 begin to resonate. For example, the leakage inductance (not specifically shown) of the transformer 130 begins to resonate with the parasitic capacitance of the primary FET 140. Thus, after demagnetization the voltage at the switch node 138 begins to oscillate. The oscillating voltage at the switch node 138 is reflected on the auxiliary winding 136. When the example power converter 100 operates in a quasi-resonant operation, the controller 190 observes the oscillations in some form (e.g., by way of the ZCD terminal), and makes the primary FET 140 conductive again in a valley of the oscillation. Activating the primary FET 140 in the valley of the oscillation reduces the voltage across the primary FET 140, which reduces switching losses and increases efficiency. Depending on the magnitude of the power provided to the load 179, the controller 190 may select any suitable valley of the oscillation (e.g., the first valley for higher loads, the sixth valley for lower loads).

Figure 2:
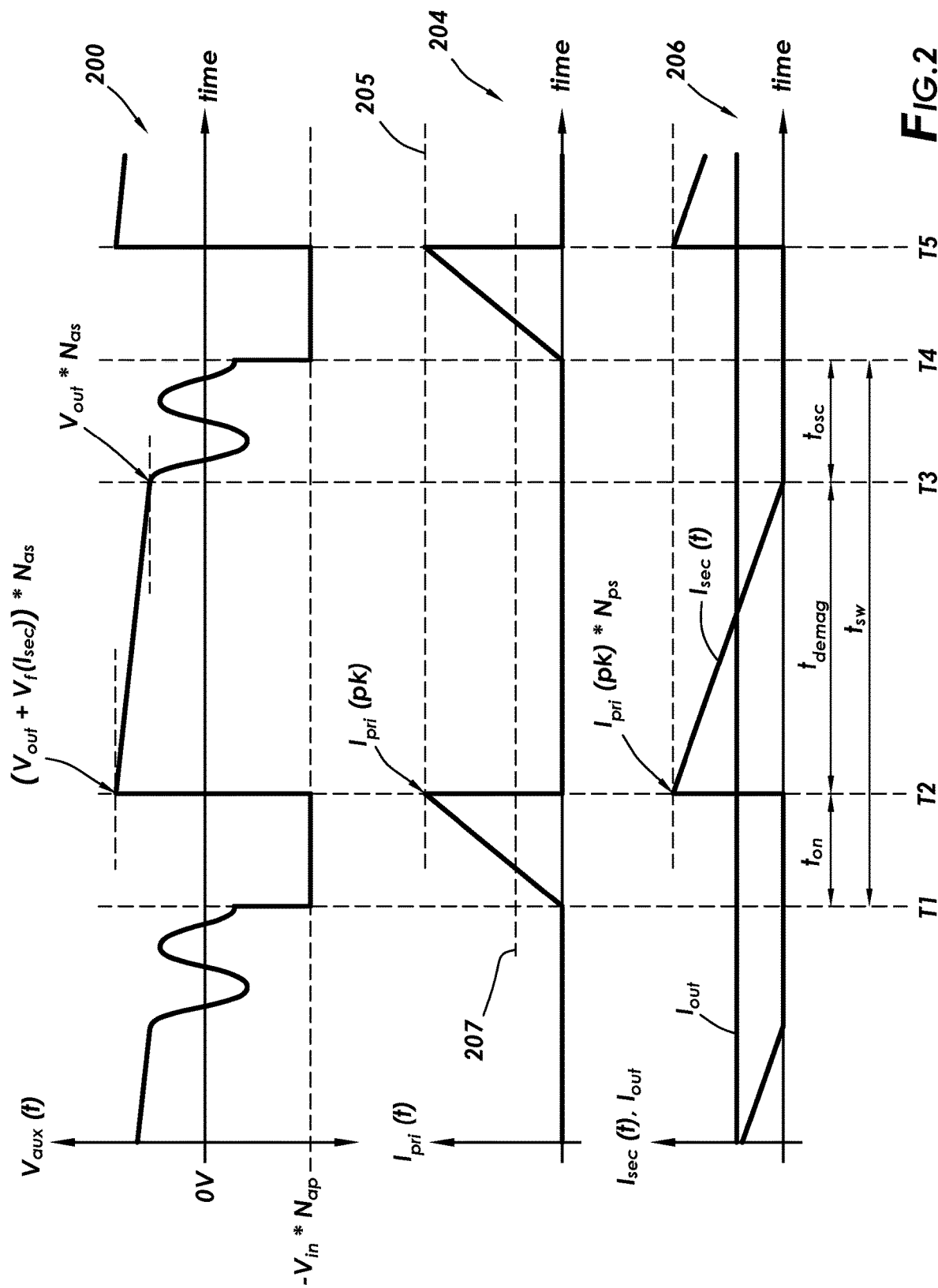
FIG. 2 shows a timing diagram of example operation of a power converter in accordance with at least some embodiments.

FIG. 2 shows a series of co-plotted signals with the power converter operating in a discontinuous conduction mode, and specifically quasi-resonant operation. In particular, plot 200 shows voltage on the auxiliary winding 136 as a function of time, plot 202 shows current through the primary winding 132 as a function of corresponding time, and plot 204 shows current through the secondary winding 134 as a function of corresponding time. FIG. 2 shows a complete switching period $t_{SW}$ between times T1 and T4, as well as portions of a previous switching period (e.g., before time T1) and portions of a subsequent switching period (e.g., after time T4). The example charge mode $t_{on}$ begins at time T1 and extends to time T2. During the charge mode current ramps in the primary winding 132 as shown by plot 204. As the current is ramping in the primary winding 132, the voltage on the auxiliary winding 136 is negative as shown, and has a magnitude being the negative of the input voltage $V_{IN}$ times the turns ratio of the auxiliary winding to the primary winding $N_{ap}$. Further during the charge mode, because of the flyback arrangement, no current flows in the secondary winding 134 as shown by plot 206. When the current in the primary winding 132 reaches the current setpoint (designated $I_{pri(pk)}$ in the figure), the primary FET 140 is made non-conductive, and the current in the primary winding 132 drops to zero as shown in plot 204. Thus begins the discharge mode.

The example discharge mode begins at time T2, and for purposes of this specification and the claims extends until the immediately subsequent charge mode, which in the example of FIG. 2 begins at time T4. The discharge mode may be conceptually divided into a time duration to reach demagnetization of the transformer 130 between times T2 and T3 (designated $t_{demag}$ in the figure), and a further time duration within which the switch node 138 is oscillating (designed $t_{OSC}$ in the figure) as shown in plot 200 by the voltage on the auxiliary winding 136 between times T3 and T4. In the example shown, the immediately subsequent charge mode begins in the second valley of the oscillation, but the charge mode may begin at any suitable valley in quasi-resonant operation.

During the discharge mode, the current in the secondary winding 134 jumps to an initial current having a magnitude being about equal to the peak current in the charge mode (again designated $I_{pri(pk)}$ in the figure) times the turns ratio of the primary winding to the secondary winding $N_{ps}$. The secondary current ramps down as shown in plot 206, and reaches zero at the time T3 being the demagnetization event. Further as shown in plot 206, the current through the secondary winding remains effectively zero until the next discharge mode begins at time T4.

Still referring to FIG. 2, and particularly plot 200. For reasons that will become clearer based on the discussion below, note that certain values may be determined or derived from the voltage on the auxiliary winding 136 as sensed by the controller 190. In particular, in example cases the controller 190 may read a value or signal indicative of output voltage by way of the auxiliary winding 136. At time T2 being the beginning of the discharge mode, the voltage on the auxiliary winding 136 initially jumps to a value being the sum the output voltage $V_{OUT}$ and a voltage proportional to the current flow in the secondary winding (designated $V_f(I_{sec})$ in the figure) multiplied by the turns ratio of the auxiliary winding to the second winding $N_{as}$. However, at the instant in time that the current through the secondary winding reaches zero at time T3, the voltage on the auxiliary winding 136 drops to the output voltage $V_{OUT}$ multiplied by the turns ratio $N_{as}$. Thus, the controller 190 may determine a signal indicative of output voltage by sampling the voltage induced on the auxiliary winding 136 at the instant that the current in the secondary winding 134 reaches zero. Stated otherwise, the controller 190 may determine a signal indicative of output voltage by sampling the voltage of the auxiliary winding 136 just before demagnetization.

Still referring to FIG. 2, and particularly plot 204. The various plots show operation of the power converter 100 in a valley selection or quasi-resonant operation. In quasi-resonant operation, the current setpoint at which the example charge modes end is based a difference between a setpoint voltage and the output voltage of the power converter 100—in feedback control parlance an error signal. Thus, the dashed line 205 represents the current setpoint. In rising from zero current starting at time T1, the current in the primary winding 132 also rises through a foldback threshold shown by dashed line 207. As discussed in greater detail below, when the current setpoint meets or falls below the foldback threshold (e.g., the power provided to the load is decreasing and output voltage $V_{OUT}$ is rising), the power converter 100 may enter a frequency foldback operation.

The specification now turns to changes in operation of the power converter 100 as a function of power provided to the load. Consider first that the example power converter 100 is providing a nameplate or full load power rating (e.g., 60 Watts). At full load power, the example power converter 100 may operate such that each discharge mode ends and next charge mode begins before current reaches zero in the secondary winding 134 (e.g., before demagnetization). Thus, current is flowing in either the primary winding 132 or the secondary winding 134 at all times, and such operation may be referred to as continuous conduction mode. However, as the magnitude of the power provided to the load begins to decrease, the current setpoint in each charge mode likewise decreases, and at some point the operation of the power converter 100 may transition to a discontinuous conduction mode in which, during each discharge mode, the transformer 130 demagnetizes before the next charge mode begins, such as the quasi-resonant operation discussed with respect to FIG. 2. In quasi-resonant operation, initially charge modes may begin in the first valley of the oscillation of the switch node 138, but as the power provided to the load continues to decrease each charge mode may begin in later valleys of the oscillation (e.g., the second valley, the sixth valley). In addition to selecting later valleys to begin the charge modes, the current setpoint for each charge mode may likewise drop to help regulate the energy provided to the secondary side 104.

As the power provided to load continues to decrease, and the current setpoint for each charge mode continues to decrease, the example power converter 100 may enter frequency foldback operation. In particular, the example controller 190 implements the foldback threshold (e.g., line 200 of FIG. 2), and when the current setpoint falls below the foldback threshold, the example controller implements the frequency foldback operation. In frequency foldback operation, each charge mode begins after the demagnetization event but with a delay time longer than implemented when selecting valleys in quasi-resonant operation. The delay time may be variable based on the magnitude of the power provided to the load, and the delay time may result in the next charge mode beginning at a point in time that is not necessarily aligned with a valley in the oscillation at the switch node 138. Implementing a delay time after demagnetization slows the switching frequency of the converter. The delay time may continue to increase, and thus the switching frequency may continue to decrease, until the switching frequency falls to a certain point (e.g., 25 kilo-Hertz), at which point the power converter 100 may enter skip mode.

As the magnitude of the power provided to the load continues to decrease, the power converter 100 may enter a skip mode in which switching by the controller 190 is paused (e.g., no charge modes are entered, and thus no discharge modes occur). Because one or more charge and discharge modes are skipped, the pausing is referred to as skip mode. The controller 190 continues to monitor the output voltage $V_{OUT}$ (e.g., by way of the FB terminal). When the signal indicative of output voltage indicates the output voltage $V_{OUT}$ has fallen sufficiently, the controller 190 again enables switching which creates charge and discharge modes (e.g., a burst of pulses), and in example cases the burst of pulses is in conformance with frequency foldback operation. Assuming the magnitude of the power provided to the load is still low, the power converter 100 may implement the frequency foldback operation for a period of time, but then once again enter the skip mode. Cycling back and forth between frequency foldback operation and skip mode may continue as long as the power provided to the load is low.

In related-art power converters, entering frequency foldback operation is aligned with the foldback threshold (sometimes referred to minimum peak current in the industry). In particular, in related-art power converters when current setpoint derived from the voltage error signal falls below the foldback threshold, the controller nevertheless causes the current in each charge mode to rise past the current setpoint and end instead at the foldback threshold. Related-art converters in frequency foldback operation end all charge modes when the current in the primary winding reaches the foldback threshold and in spite of the current setpoint derived from the voltage error signal being below the foldback threshold. Stated slightly differently, in related-art power converters, during frequency foldback operation the peak current in each charge mode is the minimum peak current regardless of the magnitude of the voltage error as between the setpoint voltage and the actual output voltage.

Further still, in related-art converters the skip mode is entered based on the power provided to the load falling below a specific output power, as measured with respect to parameters on the primary side 102. In particular, each charge mode represents a certain amount of energy—the energy proportional to the square of the peak current in the primary winding when the charge mode ends. Power is defined as a rate of energy delivery as a function of time. Since the skip mode is entered from frequency foldback operation, the peak current in frequency foldback operation in the related art is the foldback threshold. For power converters whose output voltage is selectable (e.g., converters operated under USB Power Delivery (PD) specification), the output voltage may be selectable in a range from 3.3V to 24V. Entering skip mode at a specific and fixed output power causes issues.

Figure 3:
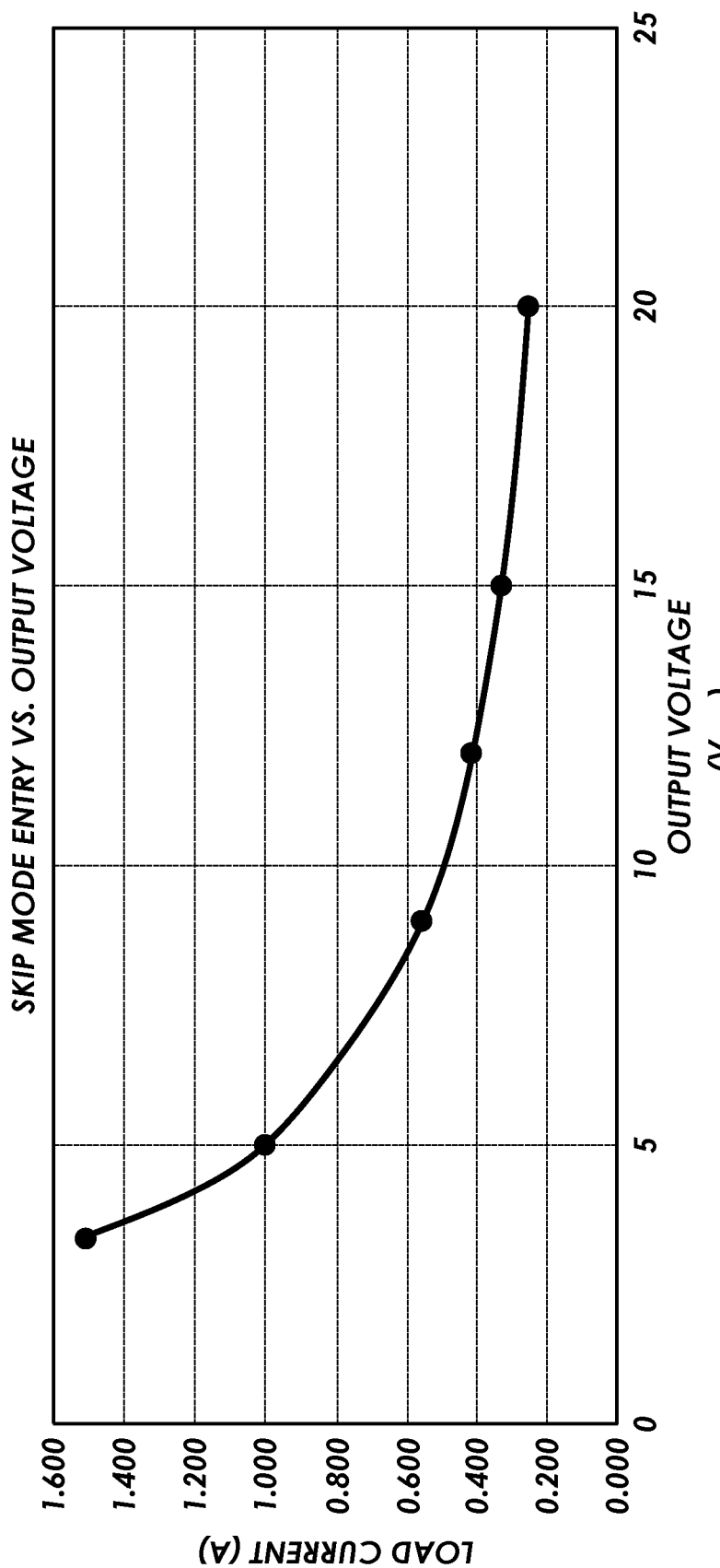
FIG. 3 is a plot of example load currents during skip mode entry of the related art.

FIG. 3 is a plot of load currents at skip mode entry of the related art. In particular, FIG. 3 shows load current as function of output voltage at skip mode entry in related-art converters that enter skip mode at a fixed output power. In the example graph, when output voltage is 20V, related-art converters may enter skip mode at a load current of about 250 milliamps (e.g., skip mode is entered at about 5 Watts for a nameplate or full load power rating of 60 Watts). However, as the selected output voltage decreases in the related-art, the load current at skip mode entry increase. For example, when the output voltage is 5V, related-art converters may enter skip mode at a load current of about 1 Amp as shown in FIG. 3. When output voltage is 3.3V, related-art converters may enter skip mode a load current of about 1.5 Amps as shown in FIG. 3. Entering skip mode with high load currents (e.g., 1 Amp, 1.5 Amps) results the power converter quickly transitioning back and forth between skip mode and frequency foldback operation, which results in significant ripple of the voltage output. Related-art converters attempt to address the issue by increasing the output capacitance. However, additional capacitors increase the cost and size of the converters.

Power converters in accordance with various examples of this specification address, at least in part, the issues noted above by adjusting the skip mode entry based on the output voltage $V_{OUT}$ of the power converter 100. More particularly, in various examples the controller 190 enters skip mode when load current falls below a skip threshold implemented by the controller 190 based on the output voltage $V_{OUT}$ (e.g., for USB-PD, 3.3V, 5V, or 20V). In some cases, the power converter 100 enters skip mode at about the same load current regardless of the selected output voltage $V_{OUT}$ of the power converter 100.

Figure 4:
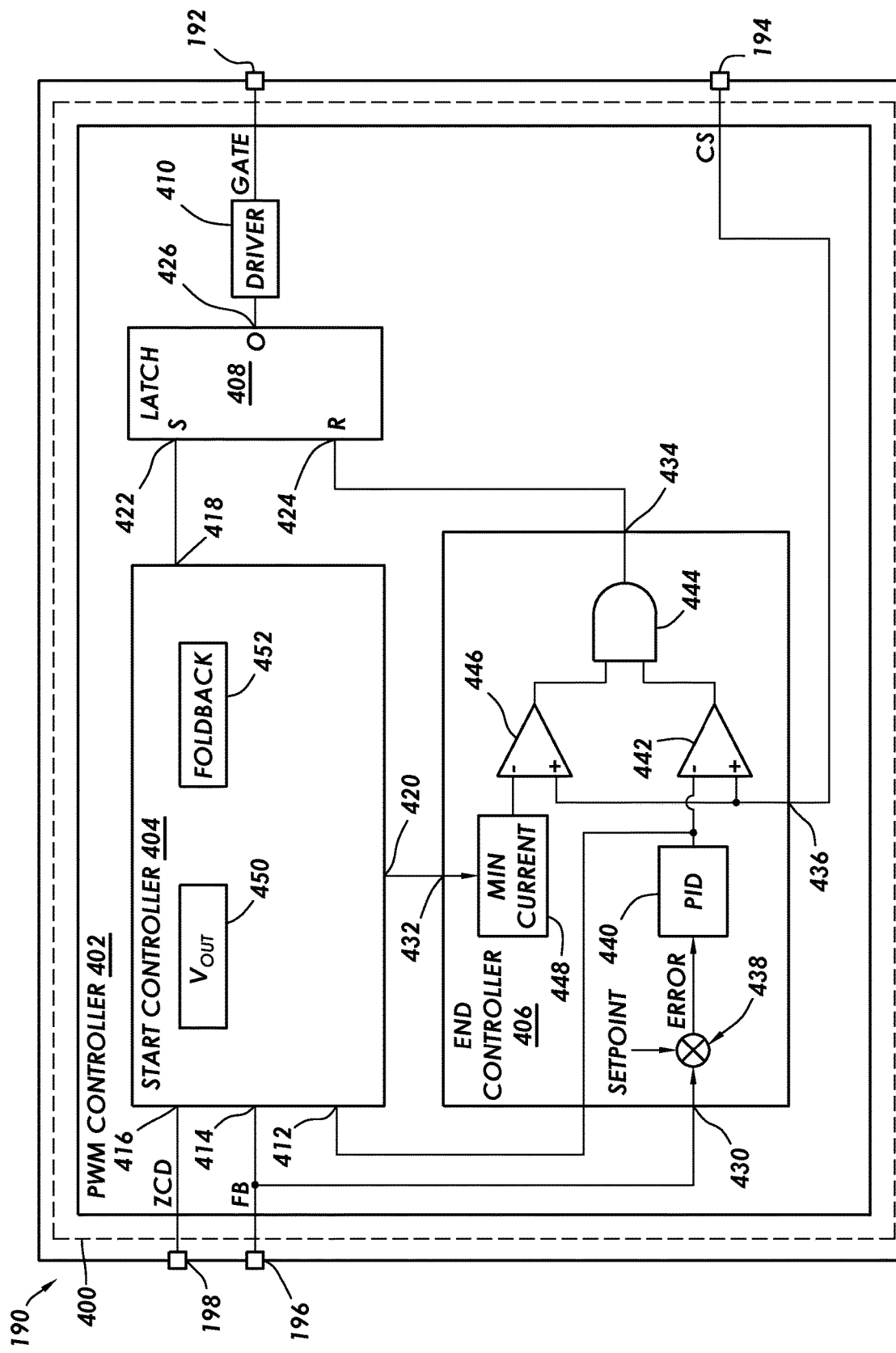
FIG. 4 is partial schematic and partial block diagram of a controller in accordance with at least some embodiments.

FIG. 4 shows a block diagram of an example controller 190. In particular, the controller 190 may comprise electrical devices and circuits monolithically created on a substrate 400 and encapsulated within packaging; however, the functionality of the various components may be embodied on multiple substrates that are co-packaged (e.g., multi-chip module) and electrically coupled to each other and coupled to the various terminals. The example controller 190 defines the gate terminal 192, the CS terminal 194, the FB terminal 196, and the ZCD terminal 198. The example terminals are electrical connections exposed and accessible through the packaging. Additional terminals will be present (e.g., power terminal, reference voltage terminal, ground terminal), but those additional terminals are not shown so as not to unduly complicate the figure.

The various functional components of the controller 190 implement a pulse-width modulation controller (PWM controller 402). The PWM controller 402 controls various aspects of the power converter 100, such as operating the power converter 100 in a continuous conduction mode (CCM) when the power provided to the load is high, and transitioning to and operating the power converter 100 in a discontinuous conduction mode (DCM) as the power provided to the load decreases. More particularly, the example PWM controller 402 may operate the power converter 100 in a discontinuous conduction mode (e.g., quasi-resonant, fixed frequency discontinuous) at power levels above first threshold, and then transition the power converter 100 to frequency foldback operation as the power provided to the load continues to drop. Further still, the example PWM controller 402 may pause assertions of the gate terminal 192 as load current falls below a skip threshold that the PWM controller 402 implements based on the output voltage $V_{OUT}$.

The functionality of the PWM controller 402 may be conceptually, though not necessarily physically, divided into a charge mode start controller (hereafter start controller 404), a charge mode end controller (hereafter end controller 406), a latch 408, and a gate driver 410. The example start controller 404 defines a current-sense input 412, a feedback input 414 coupled to the FB terminal 196, a voltage input 416 coupled to the ZCD terminal 109, a start output 418, and a min-current output 420. The example latch 408 defines a latch input 422 coupled to the start output 418, a reset input 424, and a latch output 426 coupled to the gate terminal 310. In the example, the latch output 426 is coupled to the gate terminal 192 by way of a driver circuit 428. The end controller 406 defines a feedback input 430 coupled to the FB terminal 196, a min-current input 432 coupled to the min-current output 420, a reset output 434 coupled to the reset input 424 of the latch 408, and a current-sense input 436 coupled to the CS terminal 194.

Still referring to FIG. 4, and specifically to the end controller 406, the example end controller 406 defines a subtraction or difference block 438 that calculates a difference between a value indicative of setpoint voltage for the power converter 100 and a signal indicative of output voltage sensed by way of the FB terminal 196. The resultant of the difference block 438 is an error signal representing an amount or magnitude of the voltage error. The error signal in the example system is provided to a proportional-integral-differential controller (hereafter PID controller 440). The PID controller 440 creates a current setpoint based on the error signal and various proportional, integral, and/or differential components. In practice, all three components of the PID controller 440 need not be implemented. For example, in some cases the PID controller 440 may implement proportional only control. In other cases the PID controller 440 may implement integral only control. In yet still other cases the PID controller 440 may implement only proportional and integral control (PI control). The current setpoint generated by the PID controller 440 is coupled to the inverting input of comparator 442, and the non-inverting input of comparator 442 is coupled to the current-sense input 436 and thus the CS terminal 194. The comparator 442 defines a compare output coupled to a first input of a logic AND gate 444, and the AND output of the logic AND gate 444 defines the reset output 434 coupled to the reset input 424 of the latch 408.

The example end controller 406 defines another comparator 446 having its non-inverting input coupled to the current-sense input 436 and thus the CS terminal 194. The compare output of the comparator 446 is coupled to a second input of the logic AND gate 444. The inverting input of the comparator 446 is coupled to a min-current register 448 that holds a value or a signal indicative of a minimum current. The min-current register 448 is coupled to the min-current input 432 and thus the min-current output 420 from the start controller 404. In various examples, the current value held in or by the min-current register 448 is written or driven by the start controller 404 as a function of power provided to the load and/or operational state of the power converter 100. The current value could be a digital value or an analog voltage at the discretion of the circuit designer.

The operational description starts with an assumption that the power converter 100 is providing power at a magnitude at which the controller 190 operates the power converter 100 in a discontinuous conduction mode (e.g., quasi-resonant, fixed frequency discontinuous). In particular, assume that a setpoint for the output voltage $V_{OUT}$ (e.g., 3.3V, 5V, or 20V) is applied to the difference block 438, and the controller 190 has reached steady-state operation based on the power provided to the load, such as each charge mode beginning in the second valley of the voltage oscillation at the switch node 138 (e.g., as shown and discussed with respect to FIG. 2). Further assume that the start controller 404 has previously provided the current value to min-current register 448. Further assume that the latch output 426 of the latch 408 is de-asserted and the primary FET 140 is thus non-conductive (i.e., the power converter is in the discharge mode). And finally assume that the transformer 130 has just demagnetized.

In the example controller 190, the start controller 404 receives a signal indicative of the switch node voltage by way of the voltage input 416 and ZCD terminal 198. By analyzing the signal indicative of the switch node voltage, the start controller 404 selects a valley of the oscillation within which to begin the next charge mode. Thus, at the appropriate time and within the appropriate valley, the start controller 404 asserts the start output 418 which asserts the latch input 422 of the latch 408. The latch 408, in turn, asserts the latch output 426. The gate driver 410, in turns, asserts the gate of the primary FET 140 beginning a charge mode.

The example end controller 406 receives a signal indicative of the output voltage by way of the feedback input 430 and the FB terminal 196. Based on the setpoint provided to the difference block 438, an error signal is created and provided to the PID controller 440. The PID controller 440, in turn, creates an error-based current setpoint that is applied to the inverting input of the comparator 442. As current ramps in the primary winding 132 during the charge mode, the comparator 442 compares the signal indicative of primary current to the current setpoint. When the signal indicative of primary current crosses the current setpoint, the compare output of the comparator 442 is asserted. Simultaneously, the comparator 446 compares the current value of the min-current register 448 to the signal indicative of primary current received from the current-sense input 436. When the signal indicative of primary current crosses the current value, the compare output of the comparator 446 is asserted. The presence of the logic AND gate 444 means that the signal indicative of primary current crosses both the current value in the min-current register and the current setpoint before the reset output 434 is asserted. Assertion of the reset output 434 resets the latch 408, ending the charge mode and beginning the immediately subsequent discharge mode. The example discontinuous conduction mode operation continues for as long as the power provided to the load is above a threshold, termed a foldback threshold.

The example start controller 404 implements a series of registers to hold values of interest. In particular, the example start controller 190 implements register 450 that stores a value or signal indicative of output voltage. The value or signal indicative of the output voltage could be a digital value or an analog voltage at the discretion of the circuit designer. In example cases, to populate the register 450 the start controller 404 receives, by way of the ZCD terminal 198, a signal indicative of secondary voltage on the secondary winding of the transformer of the power converter 100 during a discharge mode. Contemporaneously with sensing demagnetization as discussed above, the start controller 404 reads a signal indicative of output voltage and stores the signal in the register 450.

The example start controller 404 also implements a foldback register 452 that stores a value or signal indicative of the foldback threshold. The value or signal indicative of the foldback threshold could be a digital value or an analog voltage at the discretion of the circuit designer. The foldback threshold may be a fixed value related to the nameplate or full load power rating of the power converter 100. In one example, the foldback threshold corresponds to a load current about thirty percent (30%) of the full power load of the power converter 100, but other relationships may be implemented. The foldback threshold may be set at the time of manufacture, or may be calculated by the start controller 404 at each power-on event. As alluded to above, in example cases the foldback threshold sets the operational point at and/or below which the power converter 100 transitions to foldback operation.

Now assume that the power provided to the load drops to a point at which the controller 190 enters frequency foldback operation. In particular, as the power provided to the load continues to decrease, the current setpoint for each charge mode (as calculated by the difference block 438 and PID controller 440) likewise continues to decrease. In example cases, the start controller 404 receives the current setpoint by way of the current-sense input 412. When the start controller 404 senses, during the quasi-resonant operation, that the current setpoint is below the foldback threshold (e.g., held in register 452), the start controller 404 transitions the power converter 100 to frequency foldback operation as discussed above. That is, each charge mode is entered after a variable delay time based on the power provided to the load (e.g., as sensed by way of the FB terminal 196), and not necessarily aligned with a valley of the oscillation of the switch node 138.

The peak current at which each charge mode ends during frequency foldback operation is determined by the current value in the min-current register 448. Stated otherwise, in frequency foldback operation the current setpoint as calculated by the difference block 438 and PID controller 440 is lower than the current value supplied to the min-current register 448. Thus, in the frequency foldback operation each charge mode ends at a peak current being the current value in the min-current register 448, not the current setpoint generated by the PID controller 440. Stated in terms of the devices in the example end controller 406, during each charge mode within frequency foldback operation the compare output of comparator 442 is asserted prior to the compare output of the comparator 446, and thus the reset output 434 is asserted when the ramping current crosses the current value in the min-current register 448. In related-art controllers, the minimum peak current value during frequency foldback operation is fixed and does not change as a function of output voltage.

In example systems, the current value supplied to the min-current register 448 is variable and determined based on the output voltage $V_{OUT}$ of the power converter 100. In particular, the example power converter 100 may be operated in accordance with the USB-PD standard, and thus the output voltage $V_{OUT}$ may change over time (e.g., from 3.3V, 5V, or 20V) for different loads 179, and in some cases for the same load 179. The current value placed in the min-current register 448 is calculated or selected by the start controller 404 based on the implemented output voltage $V_{OUT}$. It follows that if the output voltage $V_{OUT}$ changes during operation (e.g., from 20V to 3.3V), the current value placed in the min-current register 448 likewise changes. Thus again, in the frequency foldback operation each charge mode ends at a peak current being the current value in the min-current register 448. It further follows that the current value in the min-current register 448 is lower than the foldback threshold that triggered the start controller 404 to transition to frequency foldback operation.

The start controller 404 writes or provides the current value to the min-current register 448. In some examples, the current value is selected in discrete steps based on the output voltage $V_{OUT}$. For example, the current value may be set to a first value when the setpoint for the output voltage $V_{OUT}$ is a first value (e.g., 3.3V), a second value when the setpoint for the output voltage $V_{OUT}$ is second value (e.g., 5.0V), and a third value when the setpoint for the output voltage $V_{OUT}$ is a third value (e.g., 20V).

In other examples, the current value is determined by scaling a predetermined current value based on the output voltage $V_{OUT}$. For example, the PWM controller 402, and in the example the start controller 404, may determine the current value using the following equation:

$$V_{CS(min)} = V_{CS(peak)} / \sqrt{2.4/V_s} \qquad (1)$$

wherein $V_{CS(min)}$ is the current value (expressed as a voltage), $V_{CS(peak)}$ is the predetermined current value (again, expressed as a voltage), and $V_s$ is the signal indicative of output voltage. In some example cases, the output voltage $V_{OUT}$ is scaled down by 10 to arrive at the signal indicative of output voltage $V_s$ (e.g., the output voltage measurement $V_s$ is 1/10th of the output voltage $V_{OUT}$). Thus, in an example situation in which the output voltage is 24 Volts, the signal indicative of output voltage $V_s$ is 2.4V, and the value of the square root is unity—resulting in the current value $V_{CS(min)}$ equal to the predetermined current value $V_{CS(peak)}$. As another example, when the output voltage $V_{OUT}$ is 5V and thus the signal indicative of output voltage $V_s$ is 0.5 Volts, the value of the square root is 2.19—resulting in the current value $V_{CS(min)}$ being about half the predetermined current value $V_{CS(peak)}$. In some implementations, the predetermined current value $V_{CS(peak)}$ corresponds to a load current at about 10% of the full power load of the power converter 100. Stated otherwise, in example cases the start controller 404 may calculate the current value by calculating a ratio of a highest nameplate output voltage and the signal indicative of output voltage, and setting the current value based on the ratio.

Figure 5:
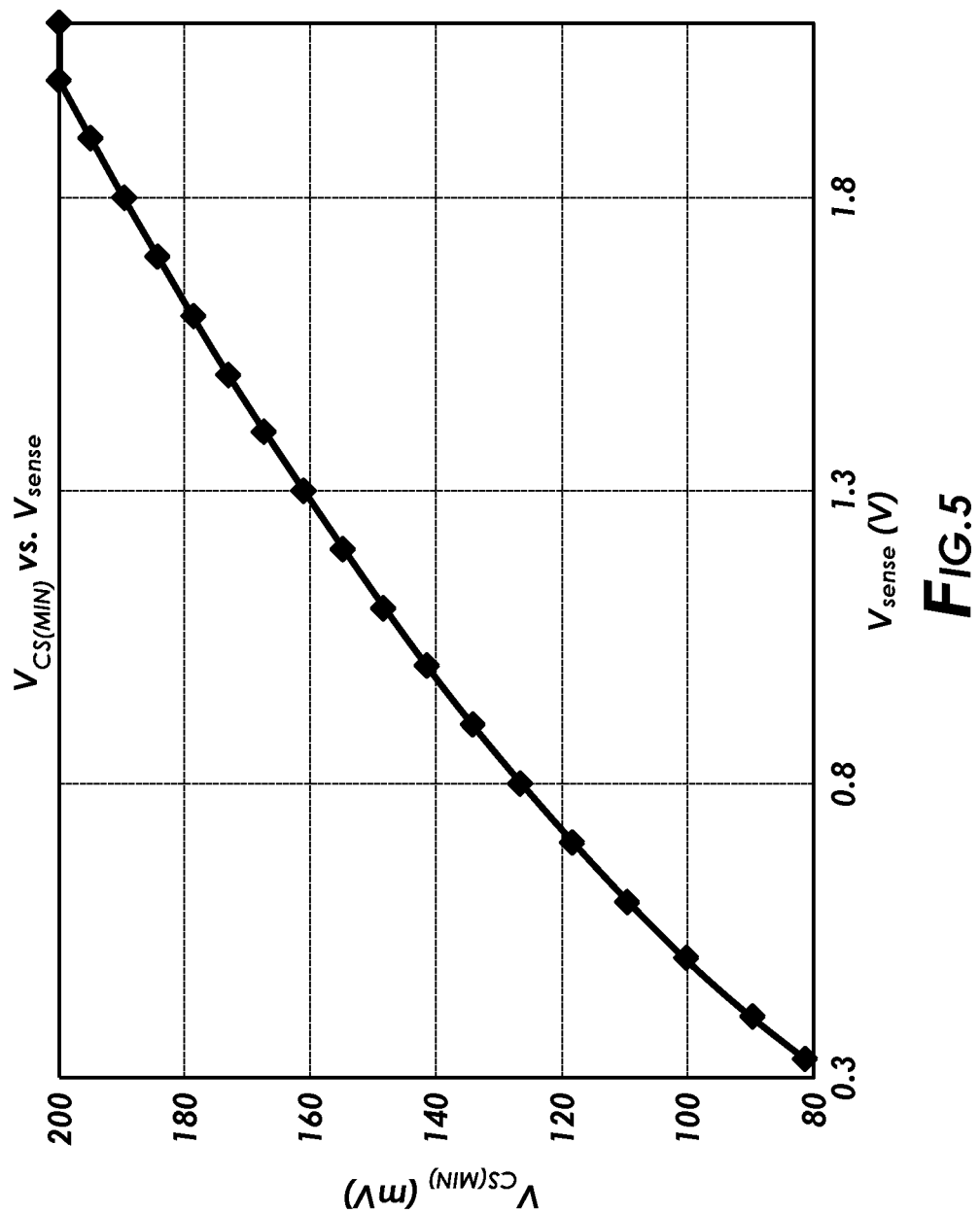
FIG. 5 is a plot of example current values as a function of output voltage in accordance with at least some embodiments.

FIG. 5 is a plot of example current values $V_{CS(min)}$ as a function of a signal indicative of output voltage $V_s$. In particular, the predetermined current value $V_{CS(peak)}$ used to generate the example plot of FIG. 5 is 200 millivolts (mV), and corresponds to the load current at about 10% of a full power load of an example power converter 100. As illustrated, the current values $V_{CS(min)}$ at and above a signal indicative of output voltage $V_s$ of 2.4V (e.g., output voltage $V_{OUT}$ at 24V and above) is fixed 200 mV. The current values $V_{CS(min)}$ decrease substantially linearly with output voltage $V_{OUT}$.

Continuing the operational progression toward skip mode for the example power converter 100, now assume that the power provided to the load decreases to a point at which the controller 190 enters skip mode. In particular, in example systems the PWM controller 402, and particularly the start controller 404, enters the skip mode from the frequency foldback operation when power provided by the power converter 100 exceeds or outpaces power drawn by the load 179 causing the output voltage $V_{OUT}$ to increase (in a voltage error sense, not a setpoint sense). For example, when the setpoint for the power converter 100 is 3.3V, the skip mode may be entered from frequency foldback operation when the output voltage $V_{OUT}$ reaches about 3.5V. As another example, when the setpoint for the power converter 100 is 5.0V, the skip mode may be entered from frequency foldback operation when the output voltage $V_{OUT}$ reaches about 5.2V. In example systems, the current value written to the min-current register 448, and thus the peak current implemented during each charge mode of frequency foldback operation, results in the power converter 100 entering skip mode at about the same load current regardless of the setpoint for the output voltage $V_{OUT}$ (e.g., for USB-PD, 3.3V, 5V, or 20V). That is to say, choosing the current value written to the min-current register 448 according to the examples above results in entering skip mode when load current falls below a skip threshold. In these embodiments, load current is not measured directly; rather, the result of implementing the current value in the min-current register 448 according to output voltage $V_{OUT}$ is entry into skip mode at about the skip threshold in each case.

An example result is that, as the power provided to the load drops, skip mode is entered later, and transitions back and forth between skip mode and frequency foldback operation occur less often, than related-art converters whose minimum peak current is a fixed value. It follows that the voltage ripple generated by the example power converter 100 will be smaller than related-converters that enter skip mode earlier and transition back and forth more often.

Figure 6:
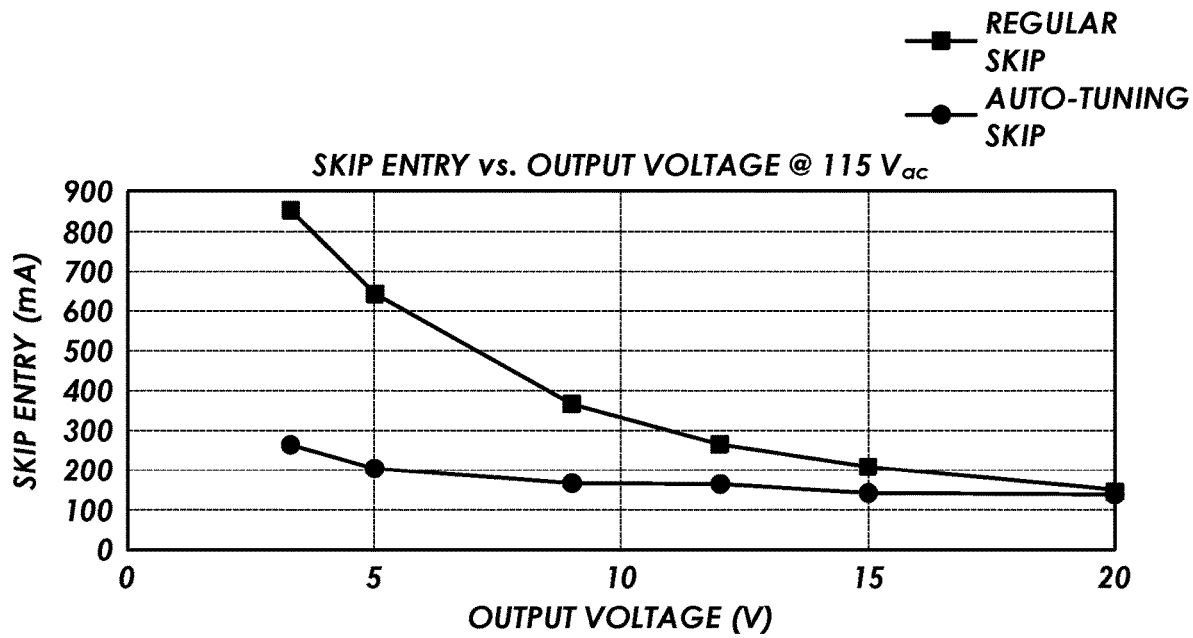
FIG. 6 is a plot of example load currents at skip mode entry for an example power converter, in accordance with some implementations.

FIG. 6 is a plot of example load currents at skip mode entry at different output voltages for an example power converter in a 115 $V_{AC}$ system. In particular, FIG. 6 plots both load currents at skip mode entry at different output voltages for a related-art circuit (labeled "Regular Skip") and an example of load currents at skip mode entry at different output voltages for power converters in accordance with the various examples of this specification (labeled "Auto-Tuning Skip"). As illustrated in FIG. 6, the load current at skip mode entry is kept low at low output voltages. For example, in FIG. 6 the load current at skip mode entry is approximately 200 milliamps when the output voltage $V_{OUT}$ is 5V, whereas the load current at regular skip mode entry is approximately 850 milliamps.

Figure 7:
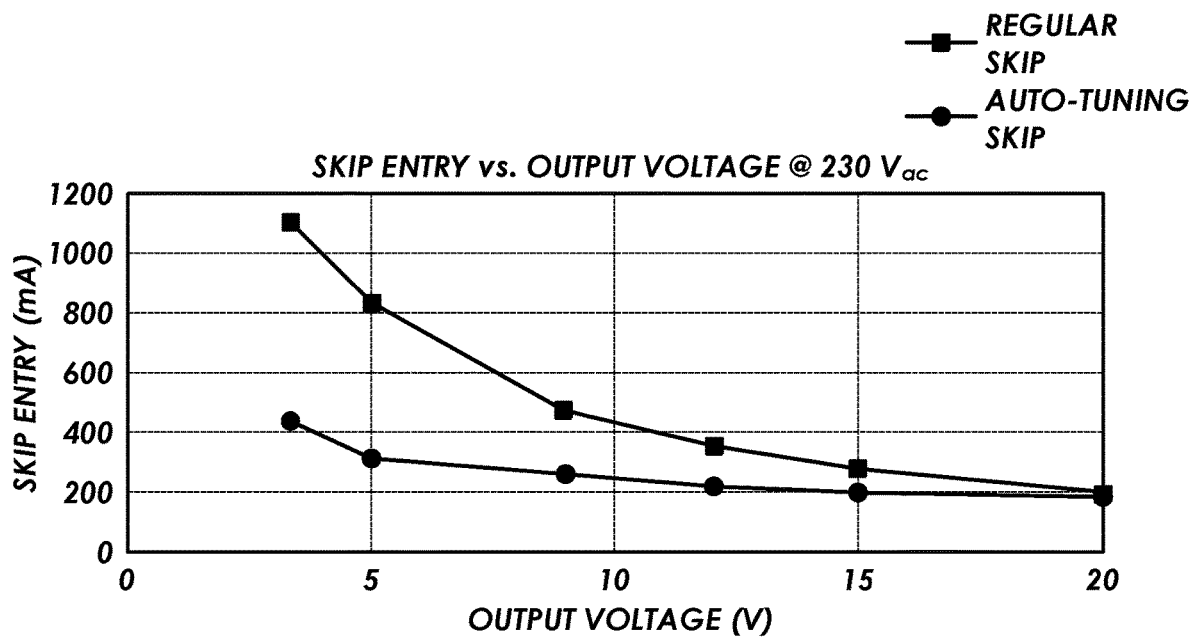
FIG. 7 is a plot of example load currents at skip mode entry for an example power converter, in accordance with some implementations.

FIG. 7 is a plot of example load currents at skip mode entry at different output voltages for an example power converter in a 230 $V_{AC}$ system. In particular, FIG. 6 plots both load currents at skip mode entry at different output voltages for a related-art circuit (labeled "Regular Skip") and an example of load currents at skip mode entry at different output voltages for power converters implemented in accordance with the various examples of this specification (labeled "Auto-Tuning Skip"). As illustrated in FIG. 7, the load current during skip mode entry is kept low at low output voltages. For example, in FIG. 7 the load current during skip mode entry is approximately 450 milliamps when the output voltage $V_{OUT}$ is 3.3V, whereas the load current during regular skip mode entry is approximately 1.1 amps.

Figure 8:
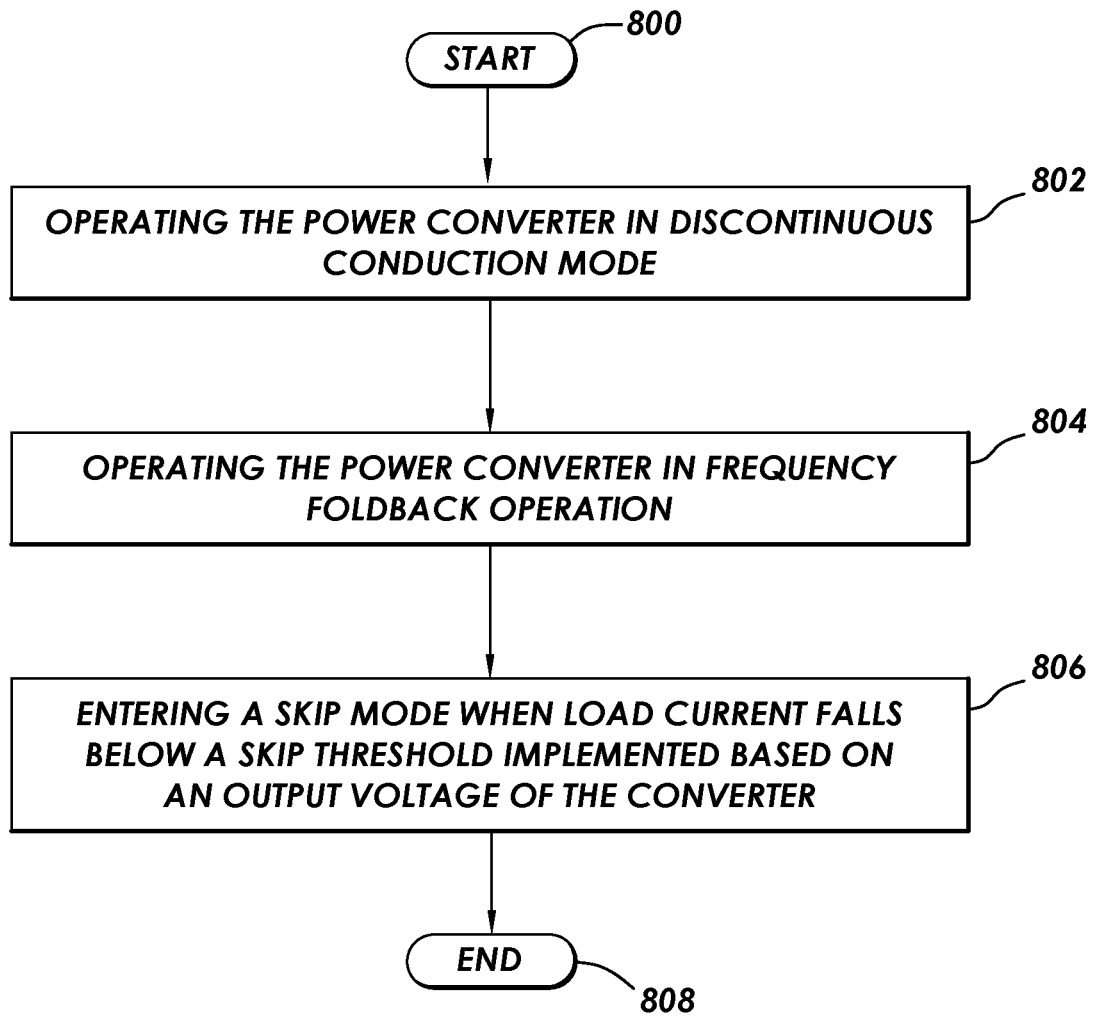
FIG. 8 shows a method in accordance with at least some embodiments.

FIG. 8 shows a method in accordance with at least some embodiments. In particular, the example method starts (block 800), and comprises: operating the power converter in discontinuous conduction mode (block 802); and operating the power converter in frequency foldback operation (block 804); and entering a skip mode when load current falls below a skip threshold implemented based on an output voltage of the converter (block 806). Thereafter the method ends (block 808).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the invention. Numerous variations and modifications will become apparent to those skilled in the art once the above disclosure is fully appreciated. It is intended that the following claims be interpreted to embrace all such variations and modifications.

What is claimed is:

1. A method of operating a power converter, the method comprising:
   operating, by a controller, the power converter in a discontinuous conduction mode; and then
   operating, by the controller, the power converter in frequency foldback operation; and
   entering, by the controller, a skip mode when a load current falls below a skip threshold implemented based on an output voltage of the power converter.

2. The method of claim 1 further comprising:
   generating a current setpoint, the current setpoint based on a difference between a setpoint voltage and the output voltage of the power converter;
   sensing, during the discontinuous conduction mode, that the current setpoint is below a foldback threshold; and
   responsive to the current setpoint falling below the foldback threshold
      transitioning to the operating the power converter in the frequency foldback operation.

3. The method of claim 2, wherein the foldback threshold corresponds to a load current of less than thirty percent (30%) of a full power load of the power converter.

4. The method of claim 1 wherein operating the power converter in the frequency foldback operation further comprises:
   reading, by the controller, a signal indicative of output voltage;
   calculating, by the controller, a current value based on the signal indicative of output voltage; and
   ending each charge mode at the current value lower than a foldback threshold at which began the operating the power converter in the frequency foldback operation.

5. The method of claim 4 wherein reading the signal indicative of output voltage further comprises:
   receiving a signal indicative of secondary voltage on a secondary winding of a transformer of the power converter during a discharge mode;
   sensing demagnetization of the transformer based on the signal indicative of secondary voltage; and
   latching a value indicative of output voltage to be the signal indicative of output voltage,
   wherein receiving the signal indicative of secondary voltage further comprises receiving the signal indicative of secondary voltage on the secondary winding of the transformer by way of an auxiliary winding of the transformer.

6. The method of claim 4 wherein calculating the current value further comprises:
   calculating a ratio of a nameplate output voltage and the signal indicative of output voltage;
   setting the current value based on the ratio.

7. The method of claim 1, further comprising:
   adjusting, by the controller, the skip threshold when the output voltage of the power converter changes.

8. A controller for a power converter, the controller comprising:
   a gate terminal, a current-sense terminal, a feedback terminal, and a winding-sense terminal; and
   a PWM controller coupled to the gate terminal, the current-sense terminal, the feedback terminal, and the winding-sense terminal, the PWM controller configured to:
      operate the power converter in discontinuous conduction mode at power levels above a first threshold;
      operate the power converter in frequency foldback operation; and
      pause assertions of the gate terminal when a load current falls below a skip threshold implemented by the PWM controller based on an output voltage of the converter.

9. The controller of claim 8 wherein the PWM controller is further configured to:
   generate a current setpoint, the current setpoint based on a difference between a setpoint voltage and a signal indicative of output voltage of the power converter sensed on the feedback terminal;
   sense, during the discontinuous conduction mode, that the current setpoint is below a foldback threshold; and
   responsive to the current setpoint falling below the foldback threshold
      transitioning to the operating the power converter to the frequency foldback operation.

10. The controller of claim 9 wherein foldback threshold corresponds to a load current of less than thirty percent (30%) of a full power load of the power converter.

11. The controller of claim 8 wherein when the PWM controller operates the power converter in the frequency foldback operation, the PWM controller is further configured to:
   read a signal indicative of output voltage;
   calculate an current value based on the signal indicative of output voltage; and
   end each charge mode at the current value lower than a foldback threshold at which began the operating the power converter in the frequency foldback operation.

12. The controller of claim 11 wherein when the PWM controller reads the signal indicative of output voltage, the PWM controller is further configured to:
   receive, by way of the winding-sense terminal, a signal indicative of secondary voltage on a secondary winding of a transformer of the power converter during a discharge mode;
   sense demagnetization of the transformer based on the signal indicative of secondary voltage; and
   latch a value indicative of output voltage to be the signal indicative of output voltage.

13. The controller of claim 12 wherein when the PWM controller receives the signal indicative of secondary voltage, the PWM controller is further configured to receive the signal indicative of secondary voltage on the secondary winding of the transformer by way of an auxiliary winding of the transformer.

14. The controller of claim 11 wherein when the PWM controller calculates the current value, the PWM controller is further configured to:
   calculate a ratio of a nameplate output voltage and the signal indicative of output voltage;
   set the current value based on the ratio.

15. A power converter comprising:
a primary side comprising a primary winding of a transformer, and a primary switch coupled to the transformer and defining a control input;
a secondary side comprising a secondary winding arranged for flyback operation and defining an output voltage, and a secondary rectifier coupled to the transformer;
an auxiliary winding of the transformer defining a sense terminal; and
a controller defining a gate terminal coupled to the control input, a current-sense terminal coupled to the primary switch, a feedback terminal coupled to the output voltage, and a winding-sense terminal coupled to the sense terminal, the controller configured to:
 operate the power converter in discontinuous conduction mode at power levels above a first threshold;
 operate the power converter in frequency foldback operation; and
 pause assertions of the control input when a load current falls below a skip threshold implemented based on a magnitude of the output voltage.

16. The controller of claim 15 wherein the controller is further configured to:
generate a current setpoint, the current setpoint based on a difference between a setpoint voltage and a signal indicative of output voltage of the power converter sensed on the feedback terminal;
sense, during the discontinuous conduction mode, that the current setpoint is below a foldback threshold; and
responsive to the current setpoint falling below the foldback threshold transition to the operating the power converter to the frequency foldback operation.

17. The controller of claim 16 wherein the foldback threshold corresponds to a load current of less than thirty percent (30%) of a full power load of the power converter.

18. The controller of claim 15 wherein when the controller operates the power converter in the frequency foldback operation, the controller is further configured to:
read a signal indicative of output voltage;
calculate a current value based on the signal indicative of output voltage; and
end each charge mode at the current value lower than a foldback threshold at which began the operating the power converter in the frequency foldback operation.

19. The controller of claim 18 wherein when the controller reads the signal indicative of output voltage, the controller is further configured to:
receive, by way of the winding-sense terminal, a signal indicative of secondary voltage on a secondary winding of the transformer of the power converter during a discharge mode;
sense demagnetization of the transformer based on the signal indicative of secondary voltage; and
latch a value indicative of output voltage to be the signal indicative of output voltage.

20. The controller of claim 18 wherein when the controller calculates the current value, the controller is further configured to:
calculate a ratio of a nameplate output voltage and the signal indicative of output voltage;
set the current value based on the ratio.

* * * * *